(12) United States Patent
Suzuki

(10) Patent No.: US 6,512,432 B2
(45) Date of Patent: Jan. 28, 2003

(54) MICROSWITCH AND METHOD OF FABRICATING A MICROSWITCH WITH A CANTILEVERED ARM

(75) Inventor: Kenichiro Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/934,844

(22) Filed: Aug. 23, 2001

(65) Prior Publication Data
US 2002/0027487 A1 Mar. 7, 2002

(30) Foreign Application Priority Data
Sep. 1, 2000 (JP) .......................... 2000-265285

(51) Int. Cl.⁷ .............. H01P 1/10; H01P 1/12
(52) U.S. Cl. .................... 333/262; 333/259
(58) Field of Search .................. 333/262, 186, 333/159, 187, 259; 134/1.3, 61, 56 R, 32; 34/341; 427/378; 200/48 A; 385/17, 18

(56) References Cited

U.S. PATENT DOCUMENTS 5,489,556 A * 2/1996 Li et al. .................. 438/53
5,556,479 A    9/1996 Bran
5,653,045 A    8/1997 Ferrell
5,714,203 A    2/1998 Schellenberger et al.
5,727,578 A    3/1998 Matthews
5,845,660 A    12/1998 Shindo et al.
6,001,191 A    12/1999 Kamikawa et al.
6,301,403 B1 * 10/2001 Heanue et al. .............. 385/18

FOREIGN PATENT DOCUMENTS

JP    8-255546    10/1996
JP    9-17300     1/1997
JP    11-232987   8/1999

* cited by examiner

Primary Examiner—Patrick Wamsley
(74) Attorney, Agent, or Firm—Sughrue Mion, PLLC

(57) ABSTRACT

A microswitch is realized that can be driven by low voltage, and at the same time, that has increased impedance between switch terminals when the switch is OFF. The relation between upper electrode (4), lower electrode (6), contact electrode (7), and signal lines (8) is arranged such that the minimum distance between contact electrode 7 and signal lines 8 is greater than the minimum distance between upper electrode 4 and lower electrode 6 when the microswitch is in the OFF state.

32 Claims, 6 Drawing Sheets

(b)

(c)

(d)

MICROSWITCH AND METHOD OF FABRICATING A MICROSWITCH WITH A CANTILEVERED ARM

BACKGROUND OF THE INVENTION

1. Field of the Invention

The present invention relates to a microswitch and to a method of fabricating the microswitch, and in particular, to a microswitch for turning ON and OFF signals ranging from DC to AC current having a broad range of signal frequencies up to several hundred GHz, and to a method of fabricating such a microswitch.

2. Description of the Related Art

The prior art will first be explained taking as an example the invention disclosed in Micro Electromechanical RF Switch (Japanese Patent Laid-open No. 17300/97, U.S. Pat. No. 5,578,976, by Jun J. Yao of Rockwell International Corporation.

A plan view of the microswitch of the invention is shown in FIG. 1, and a cross section (taken along line C–C') is shown in FIG. 2. In this microswitch, anchor structure 144 composed of thermo-setting polyimide, lower electrode 146 and signal lines 148 both composed of gold are provided on gallium arsenide (GaAs) substrate 149. Cantilever arm 140 composed of a silicon oxide film provided on anchor structure 144 extends as far as the position of lower electrode 146 and signal lines 148 and confronts these components with an interposed spatial gap. Upper electrode 141 composed of aluminum is provided on the upper surface of cantilever arm 140 from a position opposite anchor structure 144 to a position confronting lower electrode 146. In addition, contact 142 composed of gold is provided on the lower surface of cantilever arm 140 at a position confronting signal lines 148.

When a voltage of 30 V is applied between upper electrode 141 and lower electrode 146, an electrostatic force works to attract upper electrode 141 toward the substrate, whereby cantilever arm 140 bends downward and contact 142 contacts signal lines 148. As shown in FIG. 1, a gap is provided in signal lines 148 at a position confronting contact 142.

Current does not flow in signal lines 148 in the state in which voltage is not applied between upper electrode 141 and lower electrode 146, but current can flow in signal lines 148 in the state in which voltage is applied between upper electrode 141 and lower electrode 146 and contact 142 contacts signal lines 148. In this way, ON/OFF control of the flow of a current or signal through signal lines 148 can be effected by the application of voltage.

In this case, sufficient electrical isolation between upper electrode 141 and contact 142 is critical for reducing loss in the switch. In other words, the problem exists that a portion of the signal (including DC) that flows through signal lines 148 flows to upper electrode 141 in the event of an electrical short-circuit between upper electrode 141 and contact 142. Even without a short-circuit between upper electrode 141 and contact 142, a considerably large electrostatic capacity between these two components inevitably results in the flow of a portion of the AC signal that flows through signal line 148 to upper electrode 141 and to the outside. When these two components are not adequately isolated, signal leakage increases and the characteristics of the switch deteriorate.

Typically, an electrostatic switch is required to exhibit high impedance when the switch is OFF and further, to allow switching between ON and OFF by the application of a low voltage. A switch that implements switching of an RF signal therefore necessitates an increase of the distance between signal line 148 and contact 142 of the switch that is provided above signal line 148 to increase impedance when OFF. In the above-described prior art, the distance between contact 142 and signal line 148 is less than the distance between upper electrode 141 and lower electrode 146. Such a construction entails the problem that, when the distance between signal line 148 and contact 142 of the switch that is positioned above signal line 148 is increased, the distance between the voltage application components (upper electrode 141 and lower electrode 146) must also be increased, thereby necessitating the application of greater voltage to drive the voltage application components. Since electrostatic force decreases in inverse proportion to the square of the gap, reducing the distance between these voltage application components is crucial for reducing the drive voltage of the switch.

In the above-described example of the prior art, moreover, cantilever arm 140 is shaped so as to extend parallel to substrate 149. In this case, when electrostatic attraction works between lower electrode 146 and upper electrode 141 that is provided in the central portion of cantilever arm 140 to bend cantilever arm 140 toward substrate 149, the distance that contact 142 moves in the direction of substrate 149 is greater than the amount of deflection of upper electrode 141 at the position that confronts lower electrode 146, this distance being the product of the amount of deflection of upper electrode 141 and a spring ratio (the distance between contact 142 and the base of anchor structure 144 of cantilever arm 140 divided by the distance between lower electrode 146 and the base of anchor structure 144 of cantilever arm 140). Thus, when the switch is turned ON, contact 142 first contacts signal line 148 on the right side of FIG. 2. If cantilever arm 140 is constructed with sufficient flexibility, all of contact 142 can be caused to contact signal line 148. However, it has been found that generally, the electrostatic force that drives the switch is small while the rigidity of cantilever arm 140 is rather great. As a result, the problem was encountered in the prior-art construction that contact between contact 142 and signal lines 148 was insufficient, impedance was not sufficiently low when the switch was turned ON, and signal loss was therefore great. Furthermore, in the construction of above-described example of the prior art, there also occurred the problem of one-sided contact in which contact 142 made contact with only one of signal lines 148 and did not contact the other signal line 148 when the switch was turned ON. It was found that this problem is related to the fact that the dimensions of narrow portion 143 of the connecting portion between cantilever arm 140 and anchor structure 144 are determined by the voltage that is applied between upper electrode 141 and lower electrode 146 and the lack of freedom in the design of contact 142. This point will be explained in greater detail in the embodiments of the present invention.

In addition to these problems, it was found that the prior-art example has the following problems that arise from materials and fabrication processes. Cantilever arm 140 (made from silicon dioxide) of the prior-art example contacts the different materials of upper electrode 141 (made from aluminum) and anchor structure 144 (made from polyimide) over an extensive area. Because this cantilever arm 140 is designed as a mechanically flexible construction in order to decrease the drive voltage, the slight strain that arises between these different materials tends to cause a high degree of warping. The strain that causes warping largely depends on the differences in thermal expansion coefficients of the different materials and on differences in processing conditions. The silicon dioxide in the prior-art example has a thermal expansion coefficient that differs by approximately 100 times from those of aluminum and polyimide. Warpage tends to occur easily due to processing temperatures as well as to temperature changes in the ambient atmosphere after completion of the device. Fabrication conditions such as the film thicknesses of the cantilever arm and anchor structure therefore must be accurately controlled to control warpage during fabrication, and these requirements result in increased fabrication costs.

Furthermore, since the completed device is subject to the influence of temperature changes in the atmosphere, problems have arisen relating to long-term reliability such as the failure of the switch when the drive voltage fluctuates or upon the occasional application of the maximum drive power supply.

The cantilever arm structure may be modified without varying the spring rigidity by increasing the thickness of the arm if the arm width is reduced. The overall switch dimension can thus be reduced by decreasing the arm width, thereby obtaining the advantage of enabling a larger number of switches in a small area. In the prior-art example in which silicon dioxide was used in the cantilever arm, however, there exists a severe restriction on increase of the thickness of the cantilever arm. In principle, the thickness of a silicon dioxide film can be increased to 10 $\mu$m or more by increasing the growth time in a plasma enhanced chemical vapor deposition system (PECVD), but increasing growth time decreases the device processing speed and increases costs. In addition, extraneous matter tends to occur inside the device, and this leads to further problems regarding maintenance such as the need for frequent cleaning. Still further, the occurrence of greater internal strain inside a thick film gives rise to the problem of damage to the substrate during deposition. For these reasons, current practical considerations limit the thickness of the silicon dioxide film to just 2 $\mu$m. As a result, the only method of making the switch structure more compact in the construction of the prior-art example was to shorten the length of the arm. Miniaturization of the device becomes problematic when this arm length is restricted by other demands on the device, and the design of the device is therefore subject to severe limitations.

SUMMARY OF THE INVENTION

The present invention was devised to solve these problems and has as its object the provision of a microswitch that features both high impedance when the switch is OFF and a low-voltage drive, and the provision of a method of fabricating the microswitch.

To achieve these objects, the microswitch according to the present invention is provided with: a first signal line provided on a substrate; a second signal line provided on the substrate and provided with an end that is separated from the end of the first signal line by a prescribed gap; a support that is fixed to the substrate;

a flexible arm that extends from the support; an upper electrode that is connected to the support by way of this arm; a lower electrode provided on the substrate in confrontation with the upper electrode; a dielectric structure that extends from the upper electrode; and a contact electrode provided on the dielectric structure in confrontation with the gap; the arm bending in accordance with voltage that is applied between the upper electrode and lower electrode and the microswitch thereby controlling conduction/nonconduction between the first and second signal lines; wherein the upper electrode, lower electrode, contact electrode, and signal lines are arranged such that the minimum distance between the contact electrode and signal lines is greater than the minimum distance between the upper electrode and lower electrode when the microswitch is in the OFF state.

Other modes of the microswitch according to the present invention include the constructions described hereinbelow. Specifically, the arm may extend from the support in a direction that is parallel to the substrate, and the dielectric structure may curve in a direction away from the substrate with increasing distance from the arm. Alternatively, the minimum distance between the lower surface of the contact electrode and the upper surface of the signal lines may be less than the minimum distance between the lower surface of the dielectric structure that is provided below the upper electrode and the lower electrode. Alternatively, the arm may curve away from the substrate with increasing distance from the support, and the dielectric structure may extend in a straight line from the arm. Alternatively, the arm may curve away from the substrate with increasing distance from the support, while the dielectric structure may have a shape that approaches the substrate with increasing distance from the arm.

A reinforcing plate may be provided on the dielectric structure at a position that confronts the contact electrode. Alternatively, a reinforcement structure may be provided on the dielectric structure between the contact electrode and the upper electrode. Alternatively, a reinforcing plate may be provided on the dielectric structure at a position that confronts the contact electrode, a reinforcement structure may be provided on the dielectric structure between the contact electrode and the upper electrode, and the reinforcement structure and the reinforcing plate may be connected. Alternatively, the dielectric structure that is provided between the contact electrode and the upper electrode may have a width dimension in the direction parallel to the direction in which the first and second signal lines extend that is less than the width of the contact electrode. Alternatively, at least one second upper electrode may be provided on the dielectric structure at a position opposite to the upper electrode with the contact electrode interposed between, and at least one second lower electrode may be provided on the substrate in confrontation with this second upper electrode. Alternatively, the dielectric structure may be directly connected to the substrate, and the thickness of the dielectric structure is uniform. Alternatively, the substrate may be made from a glass substrate.

The method of fabricating a microswitch according to the present invention is a method of fabricating a microswitch provided with: a first signal line provided on a substrate; a second signal line provided on the substrate and provided with an end that is separated from the end of the first signal line by a prescribed gap; a support that is fixed to the substrate; a flexible arm that extends from the support; an upper electrode that is connected by way of this arm; a lower electrode provided on the substrate in confrontation with the upper electrode; a dielectric structure that extends from the upper electrode; and a contact electrode provided on the dielectric structure in confrontation with the gap; the arm bending in accordance with voltage that is applied between the upper electrode and lower electrode and the microswitch thereby controlling conduction/nonconduction between the first and second signal lines; the fabrication method including steps of: forming the first and second signal lines along with the lower electrode on the substrate; forming a member composed of the support, the arm, the upper electrode, the dielectric structure, and the contact electrode; and attaching this member onto the substrate such that the contact electrode and the gap are in confrontation; wherein the upper electrode, lower electrode, contact electrode, and signal lines are arranged such that the minimum distance between the contact electrode and signal lines is greater than the minimum distance between the upper electrode and lower electrode when the microswitch is in the OFF state.

A method of fabricating a microswitch according to the present invention includes other modes corresponding to the above-described microswitches.

As described hereinabove, by providing a curve to the cantilever structure, the present invention increases the distance between the contact electrode and signal lines in the signal portion while keeping small the distance between the upper electrode and lower electrode in the drive portion. Adopting this configuration enables the simultaneous realization of the two requirements for high impedance when the switch is OFF and low-voltage drive that were contradictory in the prior-art example. Furthermore, electrical coupling between the upper electrode and contact electrode can be suppressed to a low level by separating the upper electrode and contact electrode by a sufficient distance using a dielectric film while mechanically connecting the two components. As a result, the switch of the present invention can be used in an RF circuit having a high frequency in the millimeter wave region.

In an embodiment of the present invention, the cantilever structure is divided into two portions, one being an arm that is connected to the support and the other being an acting portion that is connected to the tip of the arm, each portion being constituted by different materials. When the arm is made from a semiconductor material, for example, the use of a single material can solve the problem encountered in the prior art that temperature changes tend to cause changes in curvature of the arm. In addition, the freedom to adopt high-temperature processing conditions (greater freedom in processing) enables easy control of the thickness of the semiconductor material over a wide range and provides a solution to the problem of the prior-art example regarding the difficulty of fabricating a structure having a thickness greater than 2 $\mu$m.

In another embodiment of the present invention, the provision of a reinforcement structure in an area of the dielectric film of the acting portion of the above-described cantilever structure other than the portion in which the upper electrode and the contact electrode are provided enables greater control of the shape of the cantilever structure. The provision of this reinforcement structure greatly increases the degree of design freedom compared to the shape control of the prior art that was realized only by the shape inherent to the dielectric film.

In another embodiment of the present invention, moreover, a drive portion is provided on both sides of the contact electrode. The attraction of each of the upper electrodes toward respective lower electrodes of these divided drive portions enables the realization of reliable contact between the contact electrode and the signal lines, thereby enabling reliable switch operation despite some variation in the curvature of the cantilever arm and allowing a solution to the problem of long-term reliability described with regard to the prior art.

In another embodiment of the present invention, a narrow portion is provided in the dielectric film that connects the upper electrode of the drive portion to the contact electrode of the contact point. Decreasing the width of this narrow portion facilitates the rotating motion of the contact electrode with the axis of the narrow portion as center and acts to prevent the problem of one-sided contact of the prior-art example. This narrow portion is at a different position than the arm that connects the cantilever structure to the support, and the narrow portion can therefore be designed independently of the voltage of the drive portion.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

The embodiments of the present invention are next explained with reference to the accompanying drawings.

First Embodiment

Figure 3:
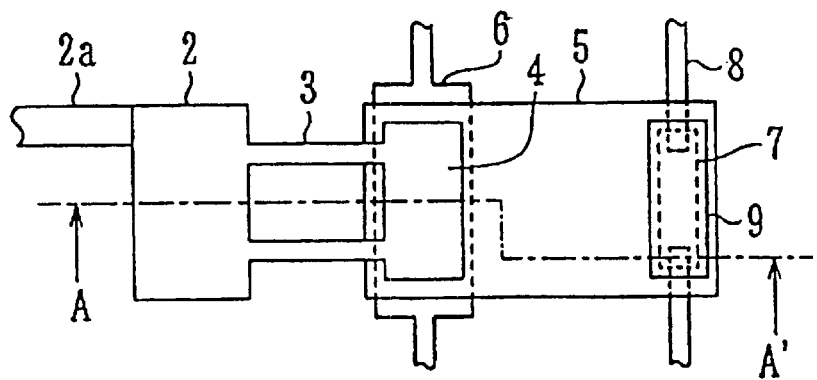
FIG. 3 is a plan view showing the microswitch of the first embodiment of the present invention.
Figure 4:
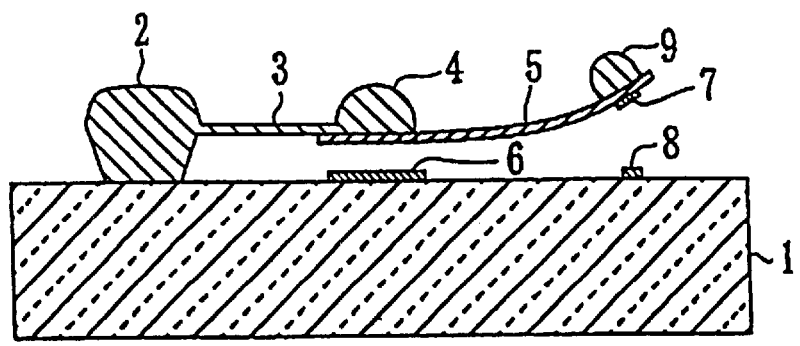
FIG. 4 is a cross section taken along line A–A' of FIG. 3 of the microswitch of the first embodiment of the present invention.

Referring now to FIG. 3 and FIG. 4, there is shown a plan view and a cross section (taken along the A–A' line) of the first embodiment of the present invention. In the present invention, support 2 composed of silicon and lower electrode 6 and signal line 8 composed of gold are provided on glass substrate 1 having a high dielectric constant. Two cantilever arms 3 composed of silicon extend from one end of support 2 in a form that is parallel to glass substrate 1. The two arms can suppress the rotational movement of the arms to a lower level than the single arm of the prior-art example, and this is useful for moving upper electrode 4 composed of silicon that is provided at the tip of arm 3 parallel to lower electrode 6 that is provided at a position that confronts upper electrode 4. In addition, the ability to stiffen the overall spring rigidity of arms 3 allows for a shortening of the length of arms 3, and this is useful for reducing the overall dimensions of the switch.

Upper electrode 4 composed of silicon is provided at the end of arm 3. Upper electrode 4 confronts lower electrode 6 across a spatial gap. Dielectric structure 5 composed of a silicon dioxide or silicon nitride film extends from upper electrode 4 to a position that confronts signal lines 8 in a shape that curves upward from glass substrate 1. Contact electrode 7 composed of gold is provided on the lower surface of dielectric structure 5 that confronts signal lines 8. Reinforcing plate 9 composed of silicon is provided on the upper surface of dielectric structure 5 opposite contact electrode 7. This reinforcing plate 9 is provided to suppress warping of dielectric structure 5 caused by strain that occurs between contact electrode 7 and dielectric structure 5 by reinforcing with silicon that is thicker than contact electrode 7 and dielectric structure 5. The provision of reinforcing plate 9 reduces the possibility that only a portion of contact electrode 7 contacts signal lines 8 when the switch is ON, and enables good switch operation because contact occurs over a wider range. Reinforcing plate 9 is not essential to the operation of the switch, and structures that do not include this component are included in the present invention.

Next, regarding the operation of this embodiment, when a voltage of 30 V is applied between upper electrode 4 and lower electrode 6, an electrostatic force works to pull upper electrode 4 down toward the substrate. Arms 3 therefore bend downward and contact electrode 7 which simultaneously moves toward signal lines 8. At this time, as will be described hereinbelow, the lower surface of contact electrode 7 can be made to contact the upper surface of signal lines 8 during the time that the lower surface of dielectric structure 5 that is provided on the lower side of upper electrode 4 is moving to contact the upper surface of lower electrode 6. As shown in FIG. 3, signal lines 8 are provided with a gap at the position that confronts contact electrode 7. As a result, a DC current cannot flow through signal lines 8 when voltage is not applied, but a DC current can flow between the two signal lines 8 when voltage is applied and contact electrode 7 contacts signal lines 8. In a case in which the signal that passes through signal lines 8 is AC, contact electrode 7 need not be caused to contact signal lines 8.

Switching of the AC signal can be realized by change in the electrostatic capacity between contact electrode 7 and two signal lines 8 that is caused by the motion of contact electrode 7. Obviously, conditions are best for reducing the pass loss of the AC signal to a minimum when contact electrode 7 contacts signal lines 8. When the applied voltage is reduced, however, electrostatic force decreases and falls below the restoration force of the spring of arm 3. At this time, contact electrode 7 separates from signal lines 8 and the switch enters the OFF state. The current or voltage signal that passes over signal lines 8 thus can be ON/OFF controlled by switching the voltage that is applied between upper electrode 4 and lower electrode 6. One feature of the present invention is that, since upper electrode 4 is electrically connected to support 2 by way of arm 3, voltage can easily be applied to upper electrode 4 through support 2.

In an embodiment of the present invention, the distance that contact electrode 7 moves toward signal lines 8 when voltage is applied is, at a maximum, substantially equal to the value obtained by multiplying the distance that upper electrode 4 moves toward lower electrode 6 by the spring ratio (the distance between the base of arm 3 at support 2 and contact electrode 7 divided by the distance between the base of arm 3 to support 2 and upper electrode 4). In the present embodiment, although the upper surface of lower electrode 6 contacts the lower surface of dielectric structure 5, contact electrode 7 that is provided on the lower surface of dielectric structure 5 contacts the upper surfaces of signal lines 8.

As a result, if the distance between the lower surface of contact electrode 7 and the upper surface of signal lines 8 is set to be slightly less than the distance between the lower surface of dielectric structure 5 that is provided below upper electrode 4 and lower electrode 6r contact electrode 7 can be made to fully contact signal lines 8 when the switch is ON. A construction having these characteristics can be realized not only by adjusting the thickness of contact electrode 7, but by adjusting the thicknesses of signal lines 8 and lower electrode 6, or adjusting the degree of curvature of dielectric structure 5.

Figure 1:
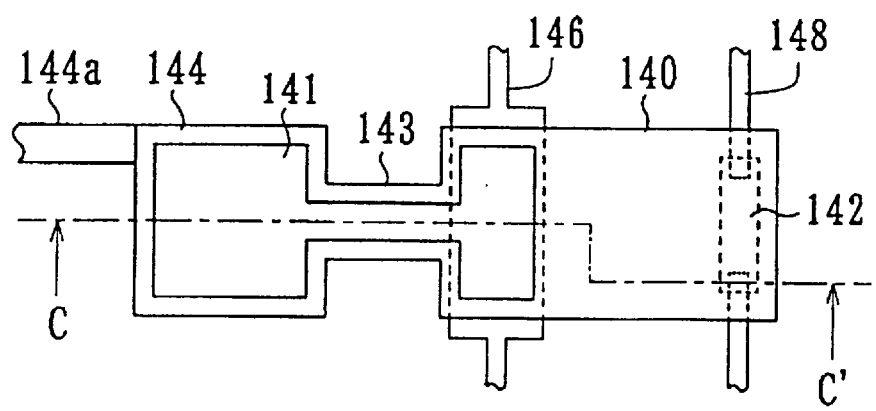
FIG. 1 is a plan view showing a microswitch of the prior art.
Figure 2:
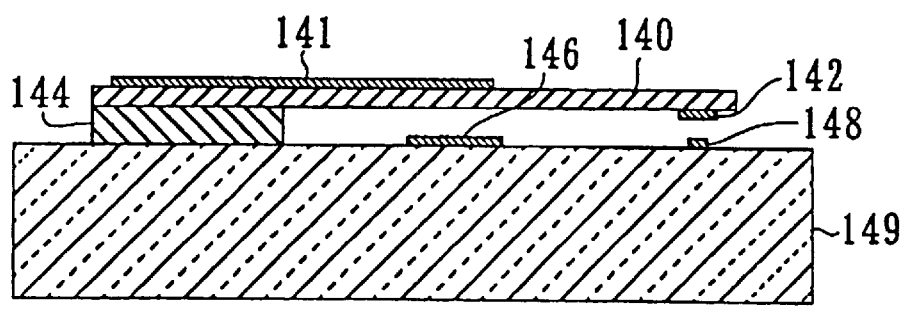
FIG. 2 is a cross section taken along line C–C' of the microswitch of FIG. 1.

In the present invention, as shown in the cross section of FIG. 4, the upward curvature of dielectric structure 5 allows the distance between contact electrode 7 and signal lines 8 to be made greater than in the construction of the prior-art example shown in FIG. 2 (in the prior-art example, the distance between contact 142 and signal lines 148 was smaller than the distance between upper electrode 141 and lower electrode 146). The electrostatic capacitance between contact electrode 7 and signal lines 8 is thus decreased and high impedance is obtained when the switch is OFF.

The distance between upper electrode 4 and lower electrode 6, on the other hand, can be set to the same as in the prior-art example. For these reasons, the present embodiment has the important feature of keeping the voltage used for ON operation of the switch at the same level as the prior art while enabling an increase in impedance when the switch is OFF.

Support 2, arm 3, upper electrode 4, and reinforcing plate 9 can be fabricated from semiconductors in which impurities are diffused in portions or throughout. Because only an extremely small current flows between upper electrode 4 and lower electrode 6 during switch operation, the amount of impurities contained by these semiconductors need not be strictly controlled. Furthermore, as will later be described in the fabrication method (FIG. 13 and FIG. 14), the thickness of arm 3 can be easily controlled to a thickness that is less than the other constituent elements. This control of the thickness of individual components enables the fabrication of arm 3 that is flexible among surrounding constituent elements having greater rigidity. In the constituent elements having high rigidity, change in shape due to internal strain is limited, whereby the shape of the switch can be accurately determined and nearly all of the deformation in the construction can be concentrated in thin arm 3. Thus, not only is the design of the switch simplified, but the further advantage is obtained that the increase in mechanical rigidity at points where mechanical contact occurs enables the realization of a switch that is capable of long-term repetitive use. In addition to the construction of this embodiment, the present invention also includes a construction in which the thicknesses of upper electrode 4 and reinforcing plate 9 are the same as that of arm 3. Such a construction has the advantage of simplifying the fabrication method, as will be explained hereinbelow.

As representative dimensions in this embodiment, arm 3 is 5 $\mu$m wide, 60 $\mu$m long, and 3 $\mu$m thick; upper electrode 4 is 50 µm wide, 100 µm long, and 10 µm thick; contact electrode 7 is 10 µm wide, 70 µm long, and 2 µm thick; and dielectric structure 5 is 1.21 µm thick and curves up by 2 µm over the 50 µm between upper electrode 4 and reinforcing plate 9. The curvature of dielectric structure 5 can be produced by taking advantage of the fact that the internal stress of a silicon nitride film that is fabricated using a chemical vapor deposition (CVD) device is tensile while the internal stress of a silicon oxide film that is fabricated by a CVD device is compressive. In this embodiment, dielectric structure 5 was fabricated by providing a silicon nitride film having a thickness of 0.21 µm on the lower side of the upper electrode, and then fabricating a silicon oxide film having a thickness of 0.8 µm and a silicon nitride film having a thickness of 0.2 µm below this film. The direction and degree of the curvature of dielectric structure 5 can be easily varied by changing the thickness and combinations of these two dielectric films.

The distance between arm 3 and glass substrate 1 is 6 µm. These dimensions relate to the impedance when the switch is OFF, RF or DC characteristics such as insertion loss and contact resistance, and the size of applied voltage during operation of the switch. These dimensions should each be designed according to each application, and by taking advantage of the greater degree of freedom in design afforded by the present invention, switches can be designed for use over a wide range of fields of application.

Second Embodiment

Figure 5:
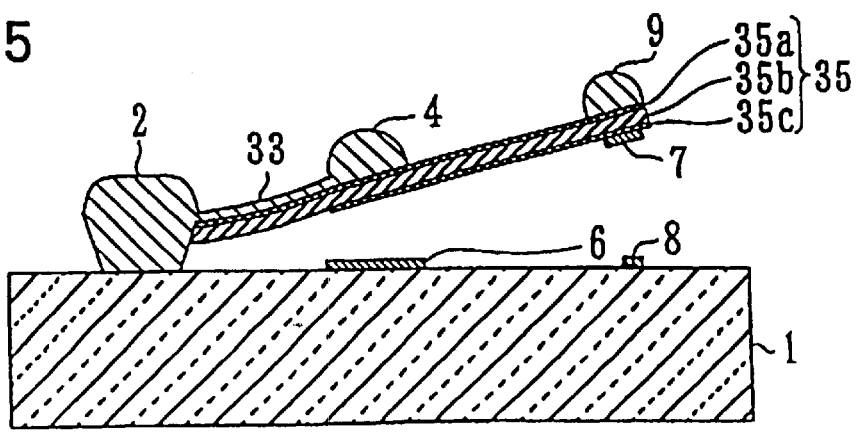
FIG. 5 is a cross section showing the microswitch of the second embodiment of the present invention.

FIG. 5 is a cross section of the structure of the second embodiment of the present invention. In this figure, constituent elements bearing the same reference numerals as in FIG. 4 indicate identical constituent elements. The second embodiment differs from the first embodiment in that arm 33 curves upward when the switch is OFF, and dielectric structure 35 has a linear shape.

Arm 33 is of a structure in which two types of dielectric films, silicon nitride film 35a and silicon oxide film 35b, which are a portion of dielectric structure 35, are provided below the layer composed of silicon material described in the first embodiment of the present invention. This two-dielectric film structure has a shape that curves upward, and the overall shape of arm 33 therefore curves upward.

On the other hand, dielectric structure 35 is constituted by a three-layer construction of silicon nitride film 35a, silicon oxide film 35b, and silicon nitride film 35c as in the first embodiment. Silicon nitride film 35a and silicon oxide film 35b extend and constitute a portion of arm 33, and the overall shape of dielectric structure 35 is linear. In this construction, the distance between contact electrode 7 and signal lines 8 is greater than the distance between upper electrode 4 and lower electrode 6 when the switch is OFF, whereby the switch can be driven by the application of lower voltage and a greater impedance can be obtained when the switch is OFF. Since dielectric structure 35 extends linearly from upper electrode 4, contact electrode 7 can easily be made to reliably contact signal lines 8 when upper electrode 4 contacts lower electrode 6 with dielectric structure 35 on its lower side interposed.

In a state in which arm 33 curves upward, the tip of upper electrode 4 also tilts upward as shown in FIG. 5. When voltage is applied between lower electrode 6 and upper electrode 4, the inclination of this upper electrode 4 decreases with the descent of upper electrode 4.

Regarding the displacement movement of the upper electrode at this time, the greatest electrostatic force upon application of voltage first occurs at the point of upper electrode 4 that is close to arm 33, which is the point of upper electrode 4 that is closest to the lower electrode, whereby the point of upper electrode 4 that is close to arm 33 is first pulled toward lower electrode 6. The inclination of upper electrode 4 gradually approaches horizontal as upper electrode 4 descends, and the electrostatic force at the other portions of upper electrode 4 gradually strengthens, shifting toward the tip, whereby the entire structure of upper electrode 4 is pulled toward lower electrode 6. The voltage required to turn ON a switch having the construction of this embodiment can therefore be determined by the distance between the point of upper electrode 4 that is close to arm 33 and lower electrode 6 (the shortest distance between upper electrode 4 and lower electrode 6).

If this distance is set such that the distance between the lower surface of dielectric structure 35 that is provided on the underside of upper electrode 4 and the upper surface of lower electrode 6 is 0.1 µm, the switch can be driven by a voltage of 10 V or less. This voltage is considerably less than the drive voltage (30 V) in the first embodiment. Furthermore, impedance when the switch is OFF can be set to substantially the same level.

As representative dimensions of the present embodiment, the silicon nitride film having a thickness of 0.21 µm that is provided on the lower side of the upper electrode in the first embodiment should be modified to a thickness of 0.2 µm, but no other modifications need be made.

Third Embodiment

Figure 6:
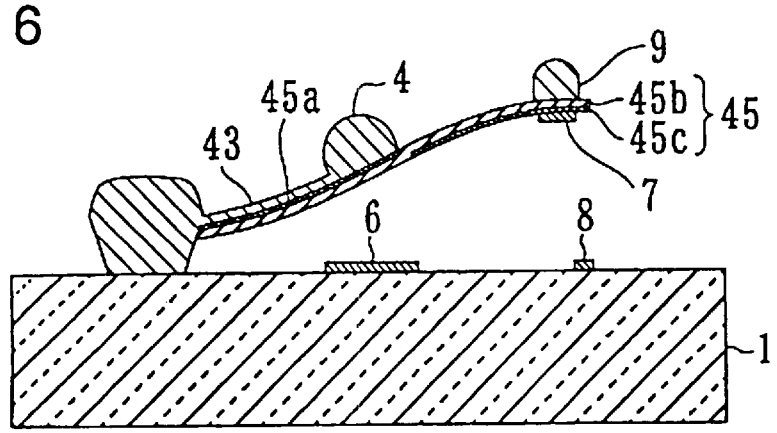
FIG. 6 is a cross section showing the microswitch of the third embodiment of the present invention.

Referring now to FIG. 6, there is shown a cross section of the construction of the third embodiment of the present invention. In this figure, constituent elements having the same reference numerals as elements of FIG. 4 and FIG. 5 indicate identical constituent elements. The greatest points of difference between the present embodiment and the first and second embodiments are that arm 43 has a shape that curves upward and dielectric structure 45 has a shape that curves downward. Arm 43 is of a structure in which two types of dielectric film, silicon nitride film 45a and silicon oxide film 45b, are provided below the layer that is composed of the silicon material described in the first embodiment of the present invention. This structure of two dielectric films has a shape that curves upward, and the overall shape of arm 43 therefore curves upward.

On the other hand, dielectric structure 45 is constituted by a two-layer construction of silicon oxide film 45b and silicon nitride film 45c in which silicon oxide film 45b extends to constitute a portion of arm 43, the silicon nitride film of arm 43 extends on the lower surface of the upper electrode, silicon nitride film 45c is not provided on the lower side of the upper electrode, and the overall shape of dielectric structure 45 curves downward. In this construction, the distance between contact electrode 7 and signal lines 8 is greater than the distance between upper electrode 4 and lower electrode 6 when the switch is OFF, thereby enabling not only a lower applied voltage to drive the switch, but an increase in impedance when the switch is OFF. In addition, since dielectric structure 45 extends from the position of upper electrode 4 with a downward curve, contact electrode 7 can be made to reliably contact signal lines 8 with greater contact force when upper electrode 4 contacts lower electrode 6 than in the second embodiment. This greater contact force is useful for decreasing resistance that occurs when contact electrode 7 and signal lines 8 are in contact, this feature being particularly advantageous when the present invention is applied to a switch for DC. As representative dimensions of this embodiment, silicon nitride films 45a and 45c have a thickness of 0.2 μm and silicon oxide film 45b has a thickness of 0.8 μm.

Fourth Embodiment

Figure 7:
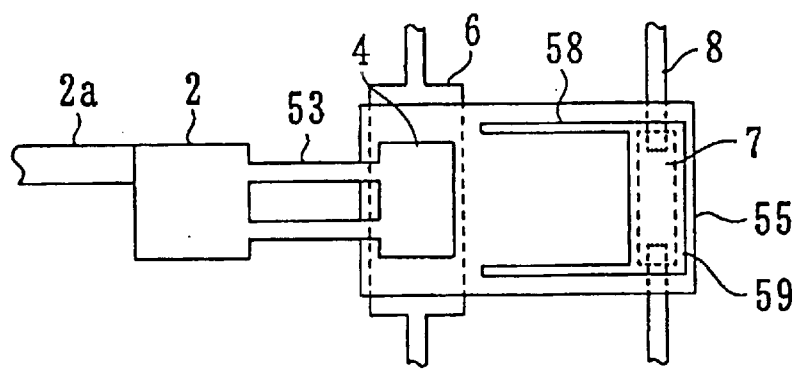
FIG. 7 is a plan view showing the microswitch of the fourth embodiment of the present invention.

We now refer to FIG. 7, in which is shown a plan view of the construction of the fourth embodiment of the present invention. Constituent elements having the same reference numerals as used in FIGS. 3–6 indicate identical constituent elements. Arm 53 and dielectric structure 55 have the same construction as any of the arms and dielectric structures in the above-described first to third embodiments. In the present embodiment, the greatest point of difference from the first to third embodiments is the provision of reinforcement structure 58 on the upper surface of dielectric structure 55 in the intermediate region between upper electrode 4 and reinforcing plate 59. Although the shape of dielectric structure 55 can be produced by the technique of combining the dielectric films explained in the above-described embodiments, it was found that the processing control required for the thicknesses of dielectric films to produce a small curvature (for example, within 2 μm) was quite problematic. This embodiment presents a technique for controlling the degree of curvature that differs from above-described technique and is particularly effective for fabricating dielectric structure 55 having a small curvature.

Reinforcement structure 58 is fabricated from the same silicon material as reinforcing plate 59 and extends parallel along the two edges of dielectric structure 55. This reinforcement structure 58 is electrically insulated from upper electrode 4, and a design is adopted that reduces the electrostatic capacitance that occurs between reinforcement structure 58 and upper electrode 4 by decreasing the area of the side surfaces of the regions in which the two components confront each other. This design involves, for example, extending reinforcement structure 58 having a long and narrow shape nearly to the point of termination of upper electrode 4, as shown in the present embodiment. Results of simulation indicate that when reinforcement structure 58 having a width of 10 μm was extended as far as the end of upper electrode 4 and the distance of closest approach of the two components was set to 20 μm, the loss for a 30-GHz signal was a small component of approximately 0.05 dB. This level of loss is within the permissible range for numerous practical applications, and it can be assumed that a significant deterioration in RF characteristics will not occur despite the provision of reinforcement structure 58 on dielectric structure 55 between upper electrode 4 and reinforcing plate 59.

It was found that the curvature of dielectric structure 55 could easily be made substantially 0 when reinforcement structure 58 having a width of 10 μm, a length of 50 μm, and a thickness of 10 μm was provided on dielectric structure 55 having a thickness of 1 μm. It is possible to realize accurate control of a slight curvature by varying the thickness of reinforcement structure 58.

When curving the shape of dielectric structure 55 in a direction parallel to arm 53, similar curvature also frequently occurs in a direction that is perpendicular to arm 53. The structures of reinforcing plate 9 and upper electrode 4 are useful for reducing this curvature. In the present embodiment, the addition of reinforcement structure 58 to these structures markedly reduces curvature in a direction perpendicular to arm [53].

In addition to this embodiment, it is also possible to provide a reinforcement structure similar to reinforcement structure 58 along the centerline of dielectric structure 55 parallel to arm 53. Alternatively, the provision of a reinforcement structure having a long and narrow shape in a direction perpendicular to arm 53 is also effective. These reinforcement structures may number from one to a plurality. Further, a multiplicity of reinforcing members may also be arranged, these members being round or rectangular instead of long and narrow. In addition, the reinforcement structure need not be connected to the reinforcing plate.

Fifth Embodiment

Figure 8:
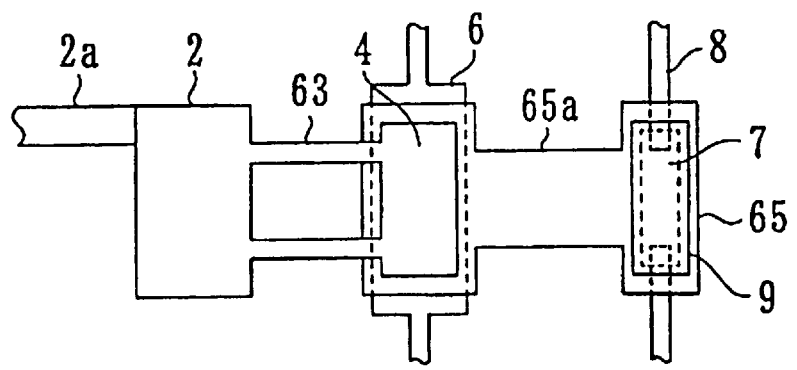
FIG. 8 is a plan view showing the microswitch of the fifth embodiment of the present invention.

We now refer to FIG. 8, in which is shown a plan view of the structure of the fifth embodiment of the present invention. In the figure, constituent elements having the same reference numerals as elements in FIGS. 3–7 indicate identical constituent elements. Apart from narrow portion 65a provided in the central portion of dielectric structure 65, arm 63 and dielectric structure 65 are both of the same construction as any of the arms and dielectric structures of the above-described first to fourth embodiments. In the present embodiment, the greatest point of difference from the first to fourth embodiment is the provision of narrow portion 65a in dielectric structure 65 in the central region between upper electrode 4 and reinforcing plate 9. Making the width of narrow portion 65a (the length in the direction that is perpendicular to arm 63) a dimension that is less than the width of contact electrode 7 reduces the rigidity of dielectric structure 65 and facilitates the rotating motion of the portion of dielectric structure 65 in which contact electrode 7 is provided with narrow portion 65a as the center. One defect in the construction of the prior-art example was the potential for one-sided contact in which contact electrode 7 contacts only one of the two signal lines 8. In the present embodiment, this one-sided contact can be prevented by adopting a construction in which contact electrode 7 easily rotates with the axis of rotation being the central axis of the switch, a direction that is parallel to arm 63 (perpendicular to signal lines 8). The construction of the present embodiment increases the degree of freedom in designing the switch because rigidity of the switch with respect to displacement in the direction of glass substrate 1 can be designed using the spring rigidity of arm 63 and rigidity with respect to the rotating movement for preventing one-sided contact can be designed by means of narrow portion 65a that is provided in dielectric structure 65.

Sixth Embodiment

Figure 9:
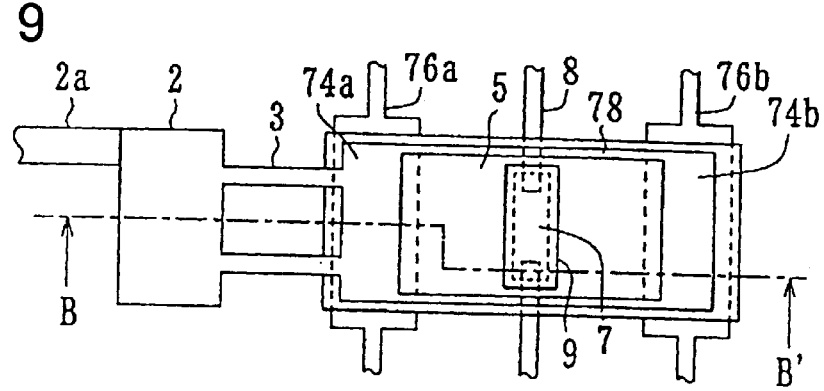
FIG. 9 is a plan view showing the microswitch of the sixth embodiment of the present invention.
Figure 10:
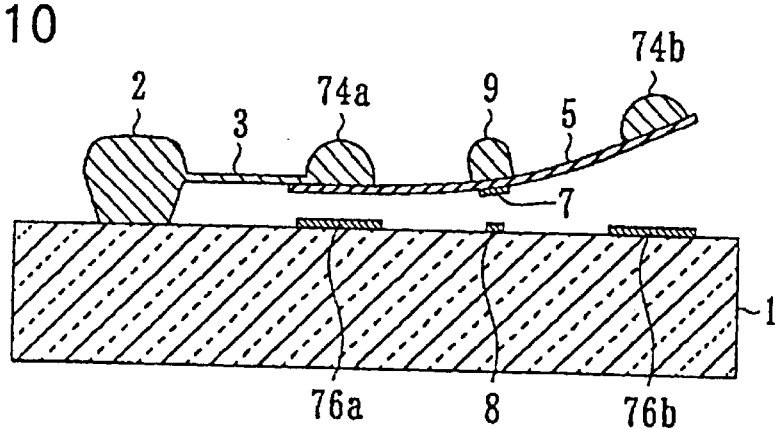
FIG. 10 is a cross section taken along line B–B' of FIG. 9 of the microswitch of the sixth embodiment of the present invention.

We refer now to FIGS. 9 and 10 in which there are shown a plan view and a cross section (taken along line B–B') of the construction of the sixth embodiment of the present invention. In the figures, constituent elements having the same reference numerals as elements in FIGS. 3 and 4 indicate identical constituent elements. In the present embodiment, the greatest point of difference from the first embodiment is the provision of first upper electrode 74a and second upper electrode 74b as well as first lower electrode 76a and second lower electrode 76b with contact electrode 7 interposed between the two sets of upper and lower electrodes in the longitudinal direction of the switch. Two connection lines 78 join upper electrode 74a and second upper electrode 74b to electrically connect first upper electrode 74a and second upper electrode 74b. Connection lines 78 can be fabricated using a metal thin-film or the same silicon material as first upper electrode 74a and second upper electrode 74b. Since the main object of these connection lines 78 is to establish electrical connection between first upper electrode 74a and second upper electrode 74b, connection lines 78 may be fabricated from, for example, the same 2 μm low-resistance silicon film as arm 3. The fabrication method can thus be simplified because connection lines 78 and arm 3 can be fabricated in the same step. In a case in which the mechanical strength of connection lines 78 is less than that of dielectric structure 5, the use of connection lines 78 does not greatly alter the degree of curvature inherent to dielectric structure 5, and the dimensions described in the first embodiment can therefore be employed. Although connection lines 78 are formed along two edges of dielectric structure 5 in the present embodiment, the present invention is not limited to this form, and the connection lines may be provided, for example, along the centerline of dielectric structure 5 in the direction parallel to arm 3 apart from the portion of reinforcing plate 9.

FIGS. 11(a) and (b) illustrate the principles of operation of the switch according to FIG. 10. FIG. 10 shows the state when the switch is OFF.

When voltage is applied between first and second upper electrodes 74a and 74b and first and second lower electrodes 76a and 76b, the distance between first upper electrode 74a and first lower electrode 76a is less than the distance between second upper electrode 74b and second lower electrode 76b, and a large electrostatic force therefore occurs between first upper electrode 74a and first lower electrode 76a. The area of first upper electrode 74a and first lower electrode 76a therefore make contact first with dielectric structure 5 interposed (FIG. 11(a)). The electrostatic force that then occurs between second upper electrode 74b and second lower electrode 76b as these two components come closer together causes second upper electrode 74b to contact second lower electrode 76b with dielectric structure 5 interposed (FIG. 11(b)).

Figure 11:
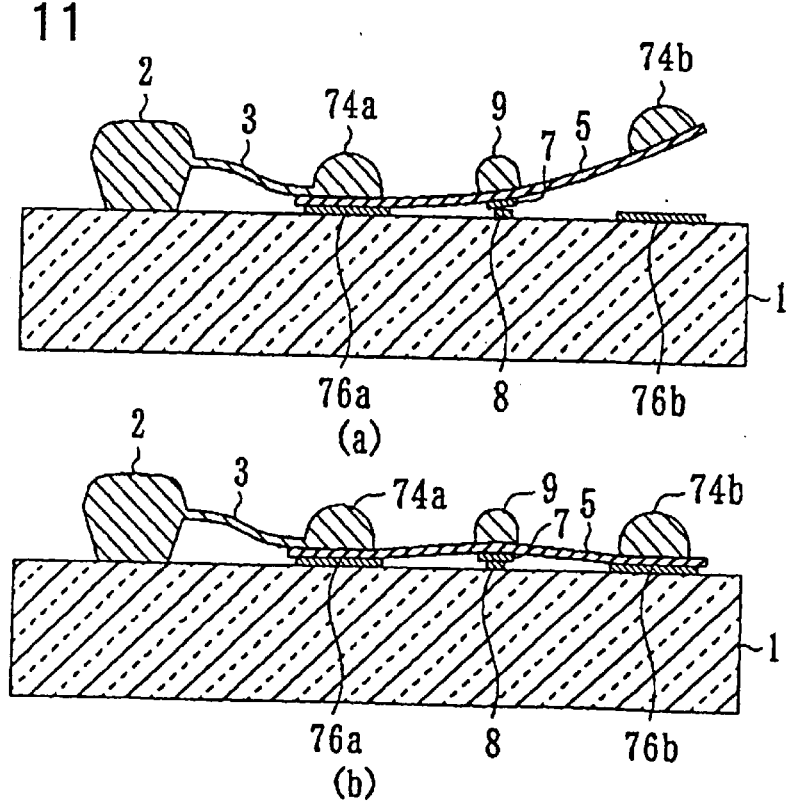
FIG. 11 is a cross section for explaining the operation of the microswitch of the sixth embodiment of the present invention.

As shown in FIG. 11, even if contact electrode 7 and signal lines 8 should fail to make contact when first upper electrode 74a and first lower electrode 76a first come into contact, contact between contact electrode 7 and signal lines 8 is guaranteed when second upper electrode 74b and second lower electrode 76b come into contact. In this case, it should be noted that the distance between second upper electrode 74b and second lower electrode 76b when first upper electrode 74a and first lower electrode 76a are in contact is less than the distance when the switch is OFF. As representative dimensions of this embodiment, arm 3 has a width of 5 μm, a length of 60 μm, and a thickness of 3 μm; first upper electrode 74a and second upper electrode 74b have a width of 50 μm, a length of 100 μm, and a thickness of 10 μm; contact electrode 7 has a width of 10 μm, a length of 70 pm, and a thickness of 2 μm; and dielectric structure 5 has a thickness of 1.21 μm, measures 50 μm between each of first upper electrode 74a and second upper electrode 74b and reinforcing plate 9, and curves upward 5 μm. The voltage required to turn ON this switch is 40 V.

The construction of the present embodiment can be adapted to all of the previously described first to fifth embodiments. Fabricating this type of construction can ensure that contact electrode 7 makes contact with signal lines 8 despite a high degree of curvature of dielectric structure 5 and arm 3.

Although a construction was described in the present embodiment in which upper electrode 74 and lower electrode 76 were each divided into two parts, the present invention is not limited to this form, and the effect of the present invention can be obtained if these components are divided into more parts. Furthermore, the effect of the present invention can also be obtained whether voltage is applied to first lower electrode 76a and second lower electrode 76b simultaneously or voltage is applied first to first lower electrode 76a and then subsequently applied to second lower electrode 76b.

Seventh Embodiment

Figure 12:
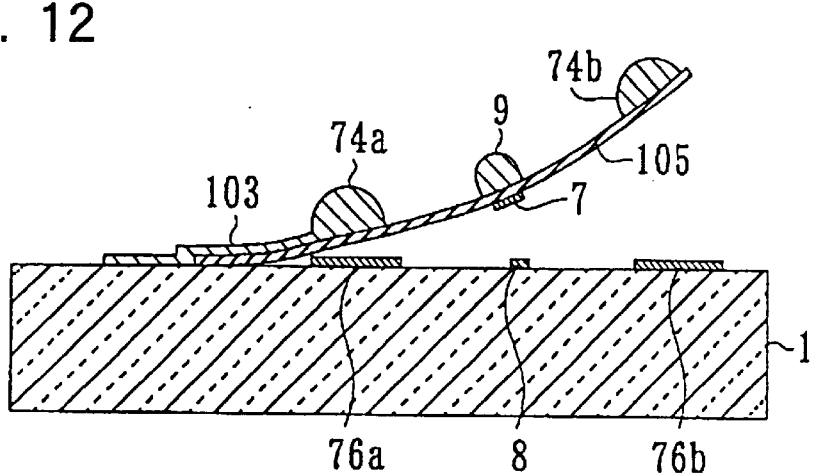
FIG. 12 is a cross section showing the microswitch of the seventh embodiment of the present invention.

We now refer to FIG. 12, in which is shown a cross section of the construction of the seventh embodiment of the present invention. In the figure, constituent elements having the same reference numerals as FIG. 10 indicate identical constituent elements. In the present embodiment, the greatest point of difference from the previously described embodiments is that one end of arm 103 is connected directly to glass substrate 1 rather than by way of a support. Arm 103 has an upward curvature using the method described in the second and third embodiments. In the present embodiment, the distance between first upper electrode 74a and first lower electrode 76a can be set to an extremely small value, and the voltage required to bring the two electrodes into contact can therefore be radically reduced. With second upper electrode 74b and second lower electrode 76b thus in a state of proximity, contact between contact electrode 7 and signal lines 8 can be reliably implemented when voltage is applied to cause second upper electrode 74b and second lower electrode 76b to come into contact.

As representative dimensions of this embodiment, arm 103 has a width of 5 μm, a length of 150 μm, and a thickness of 3 μm; first upper electrode 74a and second upper electrode 74b have a width of 50 μm, a length of 100 μm, and a thickness of 10 μm; contact electrode 7 has a width of 10 μm, a length of 70 μm, and a thickness of 2 μm; and dielectric structure 105 has a thickness of 1 μm, measures 50 μm between each of upper electrodes 74a and 74b and reinforcing plate 9, and curves upward 7 μm. The voltage required to turn ON this switch is 20 V. The lengths of the first and second upper electrodes and lower electrodes need not be equal; and for example, the first electrodes may be longer than the second electrodes.

The construction of the dielectric structure previously described in the embodiments is not limited to a construction that employs a combination of dielectric thin-films such as oxide film and nitride film as in the embodiments described so far. For example, it is also possible to construct the dielectric structure from the same semiconductor material as is used for the upper electrode. Such a construction may employ a method in which, for example, the dielectric structure, support, arm, and upper electrode are constituted by a high-resistance semiconductor material, following which impurity is diffused in only the support, arm and upper electrode and not in the dielectric structure to reduce resistance. It is further possible to employ a method of controlling curvature by increasing internal stress by using implantation of ions such as of oxygen. It is also possible to control the shape of the arm by combining these methods. Instead of fabricating the dielectric film by CVD, it is also possible to produce a film by plasma CVD and then implant ions to control internal stress. The shape of the arm or dielectric structure may also be produced by using a metal material or alumina material. The combination of these materials is not limited to this embodiment but can be applied as appropriate to all of the embodiments of the present invention.

Although a reinforcing plate was provided at a position opposite contact electrode 7 with dielectric structure interposed in the embodiments described so far, the present invention also includes constructions lacking a reinforcing plate. Alternatively, the reinforcing plate may have either high resistance or low resistance. In the present embodiment, a dielectric film is provided on the lower side of the upper electrode. This film is provided for the purpose of preventing contact and short-circuiting between the upper and lower electrodes when voltage is applied between the upper electrode and lower electrode. For the purpose of preventing short circuits, a dielectric film may be provided on the lower electrode and the dielectric film on the lower side of upper electrode omitted, or dielectric films may be simultaneously provided on both the upper and lower electrodes. It is also possible to provide the dielectric structure on the upper side of the upper electrode. Because the gap between the contact electrode and the signal lines increases in such a case, electrostatic capacity when the switch is OFF decreases and the leakage of current when the switch is. OFF can be suppressed to a low level.

In the above-described embodiments, examples were taken in which a glass substrate was used as the substrate. A glass substrate is less expensive than a gallium-arsenide substrate and further, is a material that holds promise in applications such as a phased-array antenna that call for a multiplicity of integrated switches. Nevertheless, the construction of the present invention is not limited to this form, and gallium-arsenide, silicon, ceramic, or a printed board may also be used effectively.

The present invention also includes a method in which holes are provided in the upper electrode to reduce the squeezing effect caused by air that is present between the upper electrode and lower electrode. In the present invention, the strength of the dielectric structure is easily reinforced by the upper electrode and reinforcing plate. As a result, the rigidity of the entire movable portion can be maintained at an adequate level despite the provision of a plurality of interior holes. The squeezing effect can also be markedly suppressed by also providing holes in the dielectric structure, the contact electrode, and reinforcing plate to allow air to easily pass through.

Eighth Embodiment

Figure 13:
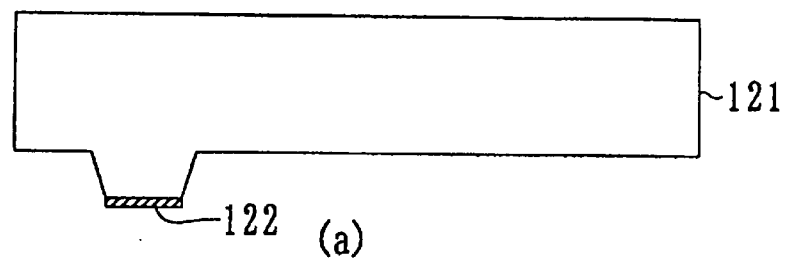
FIG. 13 shows cross sections of the fabrication process of the microswitch of the first embodiment of the present invention.
Figure 13:
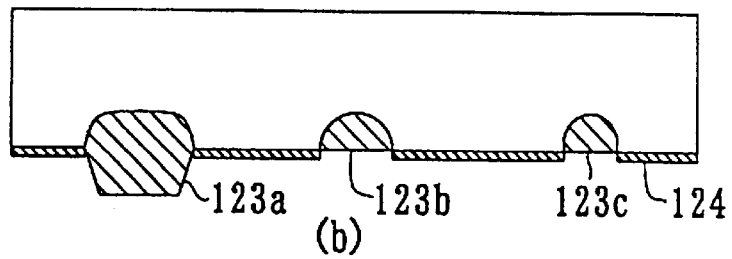
Figure 13:
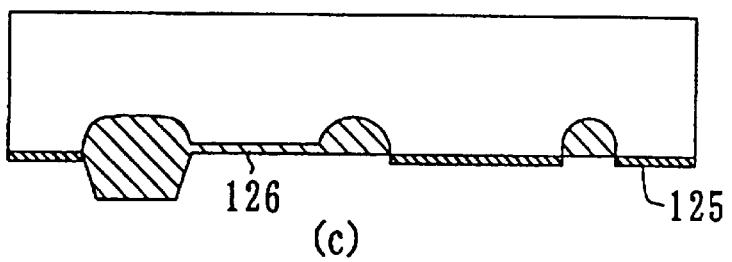
Figure 13:
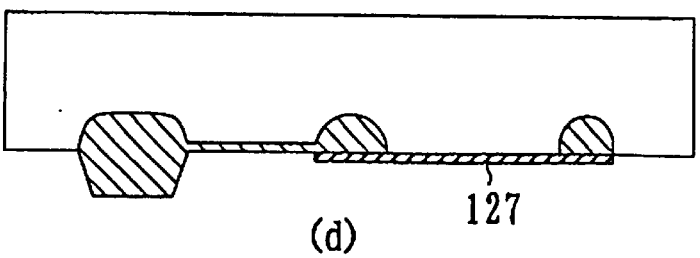
Figure 14:
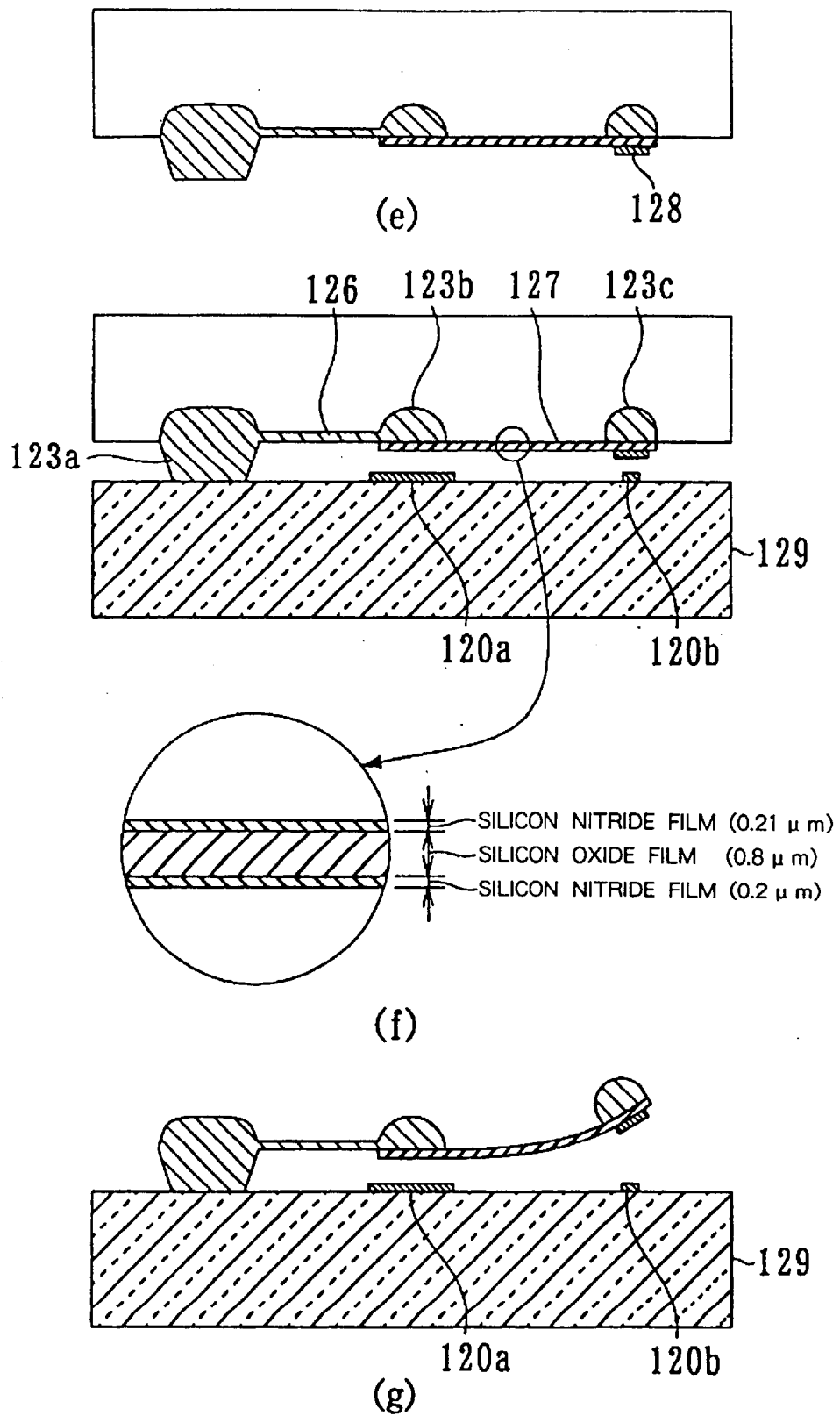
FIG. 14 shows cross sections of the continuation of the fabrication process of FIG. 13.

We now refer to FIGS. 13 and 14, in which there is shown an embodiment of the method of fabricating the microswitch of the first embodiment. Pattern 122 composed of a silicon dioxide film is formed on silicon substrate 121, and the silicon is etched approximately 6 $\mu$m using an etching solution such as TMAH (Tetramethyl Ammoniumhydroxide) (Step a). Using silicon dioxide pattern 124 as a mask, boron is diffused in areas not covered by the mask to form the patterns of support 123a, upper electrode 123b, and reinforcing plate 123c (Step b).

Thermal diffusion is carried out at, for example, a temperature of 1,150° C. for 10 hours to bring about deep diffusion of boron. In this case, boron is diffused at high concentration to a depth of approximately 10 $\mu$m. Using silicon dioxide pattern 125 as a mask, boron is next diffused in areas not covered by the mask to form the pattern of arm 126 (Step c). Thermal diffusion is carried out at, for example, 1,150° C. for two hours to bring about shallow boron diffusion. In this case, boron is diffused at high concentration to a depth of approximately 2 $\mu$m.

Dielectric structure 127 is next formed from a 0.21 $\mu$m silicon nitride film, a 0.8 $\mu$m silicon dioxide film, and a 0.2 $\mu$m silicon nitride film (Step d), following which contact electrode 128 is formed using gold plating (Step e).

The thus-fabricated silicon substrate 121 is then bonded to glass substrate 129 on which lower electrode 120a and signal lines 120b composed of gold have been formed separate from the silicon processing (Step f). Here, a pulse field-assisted bonding technique for silicon and glass can be used. The thus-formed substrate is finally placed in an etching solution having high selectivity of boron concentration such as ethylenediaminepyrocatechol whereby the microswitch is completed by dissolving silicon in areas in which boron has not been diffused (portions other than support 123a, upper electrode 123b, reinforcing plate 123c, and arm 126) (Step g).

The above-described fabrication method is a method for fabricating a switch structure on a glass substrate. If the substrate is a ceramic or gallium arsenide, it is also possible to bond these substrates to a silicon substrate using an adhesive. Alternatively, a pulse field-assisted bonding technique can be used if glass is sputtered onto the surfaces of these substrates to a thickness of 2–5 $\mu$m. In this fabrication method, the principal elements such as the arm structure are fabricated by etching the silicon substrate. The use of this type of etching method enables the use of a single-crystal material, whereby a structure having the most reliable mechanical characteristics can be fabricated. Alternatively, in addition to the methods described here, a switch having the construction of the present invention can be fabricated by depositing various thin-films on substrate 1 and then employing selective etching.

As described hereinabove, the use of the present invention enables the fabrication of a electrostatic switch having high impedance when the switch is OFF and that can be switched ON/OFF using a low applied voltage. The increased impedance when the switch is OFF decreases the leakage of RF signals, and high-frequency signals exceeding 100 GHz can be switched effectively.

Using one of the embodiments of the present invention can solve the problem of one-sided contact in which the contact makes contact with only one signal line and does not contact the other signal line when the switch is ON. Moreover, the invention increases the degree of freedom of design of the switch because this construction can be designed independently of the design of the arm, which is strongly related to the voltage that is applied between the upper electrode and lower electrode. The switch of the present invention can also reduce loss when the switch is ON because it is able to solve the problem that occurs when only one end of the contact electrode contacts the two signal lines and sufficient contact is not attained.

The use of an embodiment of the present invention can ensure contact between the contact electrode and signal lines, thereby reducing the problem of fluctuations in the drive voltage or switch operation failures that occur due to temperature changes of the ambient atmosphere either during the fabrication process or following completion of the device, and increasing the long-term reliability of the switch.

Moreover, use of one embodiment of the present invention in which the arm is fabricated from silicon single-crystal facilitates the fabrication of arm, upper electrode, and reinforcement structure having a thickness of 0.5–20 $\mu$m. Single-crystal silicon is a stable material, and its use markedly reduces changes in switch operation caused by changes in the ambient temperature of the switch.

The fabrication process is further simplified because the support, arm, and upper electrode can be fabricated from the same material. The ability to employ high-temperature processing broadens the selection of materials for the arm and other components, and the ability to use various conductors and semiconductors increases the freedom of material selection. Dielectric films that are fabricated at high temperatures have excellent voltage withstand characteristics and afford an improvement in the electrical characteristics of the device. Furthermore, increased freedom in the direction of thickness allows for a decrease in the width of the arm and enables a reduction in the size of the switch.

Owing to the above-described advantages, this microswitch can be applied not only to simple switches that are used individually or in isolation, but to new applications such as a phased array antenna that call for integration on the order of several tens of thousands of switches on a large-area substrate.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A microswitch comprising: a first signal line provided on a substrate; a second signal line provided on said substrate and provided with an end that is separated from the end of said first signal line by a prescribed gap; a support that is fixed to said substrate; a flexible arm that extends from this support; an upper electrode that is connected to said support by way of this arm; a lower electrode provided on said substrate in confrontation with said upper electrode; a dielectric structure that extends from said upper electrode; and a contact electrode provided on the lower surface of said dielectric structure in confrontation with the end of said first signal line and the end of said second signal line; said arm bending in accordance with voltage that is applied between said upper electrode and said lower electrode and said microswitch thereby controlling conduction/nonconduction between said first and second signal lines;

wherein the relation of said upper electrode, said lower electrode, said contact electrode, and said signal lines is arranged such that the minimum distance between said contact electrode and said signal lines is greater than the minimum distance between said upper electrode and said lower electrode when said microswitch is in the OFF state.

2. A microswitch according to claim 1, wherein:

said arm extends from said support in a direction parallel to said substrate; and said dielectric structure curves upward in a direction away from said substrate with increasing distance from said arm.

3. A microswitch according to claim 2, that is constructed such that a gap still remains between the lower surface of said dielectric structure that is provided below said upper electrode and said lower electrode at the time point when the lower surface of said contact electrode contacts the upper surface of said signal lines when the microswitch is in the ON state.

4. A microswitch according to claim 2, wherein a reinforcing plate is provided on the upper surface of said dielectric structure at a position that is opposite said contact electrode.

5. A microswitch according to claim 2, wherein a reinforcement structure is provided on said dielectric structure between said contact electrode and said upper electrode.

6. A microswitch according to claim 2 that is provided with a reinforcing plate that is provided on the upper surface of said dielectric structure at a position opposite said contact electrode and a reinforcement structure that is provided on said dielectric structure between said contact electrode and said upper electrode, wherein said reinforcement structure and said reinforcing plate are connected.

7. A microswitch according to claim 2, wherein the width dimension, which is parallel to the direction in which said first and second signal lines extend, of an area of said dielectric structure between said contact electrode and said upper electrode is less than the width dimension of said contact electrode.

8. A microswitch according to claim 2, wherein:

at least one second upper electrode is provided on said dielectric structure at a position opposite said upper electrode with said contact electrode interposed; and at least one second lower electrode is provided on said substrate at a position that confronts this second upper electrode.

9. A microswitch according to claim 2, wherein:

said dielectric structure is connected directly to said substrate; and the thickness of said dielectric structure is uniform.

10. A microswitch according to claim 2, wherein said substrate is composed of a glass substrate.

11. A microswitch according to claim 1, wherein:

said arm curves so as to be farther from said substrate with increasing distance from said support; and said dielectric structure extends linearly from the tip of said arm.

12. A microswitch according to claim 11, wherein:

a reinforcing plate is provided on the upper surface of said dielectric structure at a position opposite said contact electrode.

13. A microswitch according to claim 11, wherein:

a reinforcement structure is provided on said dielectric structure between said contact electrode and said upper electrode.

14. A microswitch according to claim 11, that is provided with a reinforcing plate that is provided on the upper surface of said dielectric structure at a position opposite said contact electrode and a reinforcement structure that is provided on said dielectric structure between said contact electrode and said upper electrode;

wherein said reinforcement structure and said reinforcing plate are connected.

15. A microswitch according to claim 11, wherein the width dimension, which is parallel to the direction in which said first and second signal lines extend, of an area of said dielectric structure between said contact electrode and said upper electrode is less than the width dimension of said contact electrode.

16. A microswitch according to claim 11, wherein:

at least one second upper electrode is provided on said dielectric structure at a position opposite said upper electrode with said contact electrode interposed; and at least one second lower electrode is provided on said substrate at a position that confronts this second upper electrode.

17. A microswitch according to claim 11, wherein:

said dielectric structure is connected directly to said substrate; and the thickness of said dielectric structure is uniform.

18. A microswitch according to claim 11, wherein said substrate is composed of a glass substrate.

19. A microswitch according to claim 1, wherein
said arm curves so as to be farther from said substrate with increasing distance from said support; and
said dielectric structure has a shape that approaches said substrate with increasing distance from said arm.

20. A microswitch according to claim 19, wherein:
a reinforcing plate is provided on the upper surface of said dielectric structure at a position opposite said contact electrode.

21. A microswitch according to claim 19, wherein:
a reinforcement structure is provided on said dielectric structure between said contact electrode and said upper electrode.

22. A microswitch according to claim 19 that is provided with a reinforcing plate that is provided on the upper surface of said dielectric structure at a position opposite said contact electrode and a reinforcement structure that is provided on said dielectric structure between said contact electrode and said upper electrode;
wherein said reinforcement structure and said reinforcing plate are connected.

23. A microswitch according to claim 19, wherein the width dimension, which is parallel to the direction in which said first and second signal lines extend, of an area of said dielectric structure between said contact electrode and said upper electrode is less than the width dimension of said contact electrode.

24. A microswitch according to claim 19, wherein:
at least one second upper electrode is provided on said dielectric structure at a position opposite said upper electrode with said contact electrode interposed; and
at least one second lower electrode is provided on said substrate at a position that confronts this second upper electrode.

25. A microswitch according to claim 19, wherein:
said dielectric structure is connected directly to said substrate; and
the thickness of said dielectric structure is uniform.

26. A microswitch according to claim 19, wherein said substrate is composed of a glass substrate.

27. A method of fabricating a microswitch that is provided with: a first signal line provided on a substrate; a second signal line provided on said substrate and provided with an end that is separated from the end of said first signal line by a prescribed gap; a support that is fixed to said substrate; a flexible arm that extends from this support; an upper electrode that is connected to said support by way of this arm; a lower electrode provided on said substrate in confrontation with said upper electrode; a dielectric structure that extends from said upper electrode; and a contact electrode provided on the lower surface of said dielectric structure in confrontation with the end of said first signal line and the end of said second signal line; said arm bending in accordance with voltage that is applied between said upper electrode and said lower electrode and said microswitch thereby controlling conduction/nonconduction between said first and second signal lines;
said fabrication method comprising steps of:
forming said first signal line, second signal line and said lower electrode along with said lower electrode on said substrate;
forming a member composed of said support, said arm, said upper electrode, said dielectric structure, and said contact electrode; and
bonding said member onto said substrate such that said contact electrode confronts said gap;
wherein the relation of said upper electrode, said lower electrode, said contact electrode, and said signal lines is arranged such that the minimum distance between said contact electrode and said signal lines is greater than the minimum distance between said upper electrode and said lower electrode in the OFF state of the microswitch.

28. A method of fabricating a microswitch according to claim 27, wherein:
said arm extends from said support parallel to said substrate; and
said dielectric structure is formed so as to curve in a direction away from said substrate with increasing distance from said arm.

29. A method of fabricating a microswitch according to claim 27, wherein:
a gap still remains between the lower surface of said dielectric structure that is provided below said upper electrode and said lower electrode at the time point that the lower surface of said contact electrode contacts the upper surface of said signal lines when said microswitch is in the ON state.

30. A method of fabricating a microswitch according to claim 27, wherein:
said arm is formed so as to have a curvature and curve away from said substrate with increasing distance from said support;
said dielectric structure is formed so as to extend linearly from said arm.

31. A method of fabricating a microswitch according to claim 27, wherein:
said arm is formed so as to have curvature and curve away from said substrate with increasing distance from said support; and
said dielectric structure is formed so as to have a shape that approaches said substrate with increasing distance from said arm.

32. A method of fabricating a microswitch according to claim 27, said method comprising steps of:
forming a mask at the position of a silicon substrate where said support is to be formed and using an etching solution to etch the entire surface of said silicon substrate other than the position at which said support is formed;
forming a mask except at positions where said support, said upper electrode, and said reinforcing plate are to be formed, diffusing boron, performing thermal diffusion to diffuse boron to a deep position, and then forming the patterns of said support, said upper electrode, and said reinforcing plate on said silicon substrate;
forming a mask except at positions where said arm is to be formed, diffusing boron, and then forming the pattern of said arm on said silicon substrate;
forming said dielectric structure by forming a silicon nitride film, silicon dioxide film, and silicon nitride film in a plurality of layers at the position where said dielectric structure is to be formed and;
plating gold at the position where said contact electrode is to be formed to form said contact electrode;
bonding said silicon substrate at a prescribed position of a glass substrate on which are formed said lower electrode and said signal lines that are composed of gold; and
forming a completed microswitch by using an etching solution to remove areas of said silicon substrate other than areas into which boron has been diffused.

* * * * *